United States Patent [19]
Gregory, Jr.

[11] 4,290,242
[45] Sep. 22, 1981

[54] GREENHOUSE TUBULAR INSULATION BARRIER

[76] Inventor: William T. Gregory, Jr., 2177 Eighth Ave., Sea Girt, N.J. 08750

[21] Appl. No.: 23,296

[22] Filed: Mar. 23, 1979

[51] Int. Cl.³ .............................................. E04B 1/34
[52] U.S. Cl. ......................................... 52/2; 52/741; 47/17; 47/28 A
[58] Field of Search ................ 52/2, 741; 47/17, 28 A

[56] References Cited

U.S. PATENT DOCUMENTS

| | | | |
|---|---|---|---|
| 3,741,631 | 6/1973 | Lainy ................................ | 52/2 X |
| 4,027,437 | 6/1977 | Monsky et al. ................... | 47/17 X |
| 4,038,788 | 8/1977 | Claessens ......................... | 52/2 |
| 4,163,342 | 8/1979 | Fogg et al. ....................... | 47/17 X |

FOREIGN PATENT DOCUMENTS

| | | | |
|---|---|---|---|
| 2403428 | 4/1979 | France ............................. | 52/2 |

OTHER PUBLICATIONS

*Clicon Climate Control Systems*, 1974.
"Reducing Night Heat Loses & Daytime Solar Extremes in Greenhouses", ASAE paper No. 75-4021, Perry et al.

*Primary Examiner*—Carl D. Friedman
*Attorney, Agent, or Firm*—Morgan, Finnegan, Pine, Foley & Lee

[57] ABSTRACT

A plurality of inflatable clear polyethylene tubes extending in spaced adjacent relationship longitudinally across a greenhouse at the eave level. A regulatable blower is arranged to deliver or evacuate air from a manifold which is in communication with each of the tubes. Operationally, the tubes are inflated to bear against each other and form a barrier for heat when sunlight is absent and are deflated to provide passages when sunlight is available.

7 Claims, 10 Drawing Figures

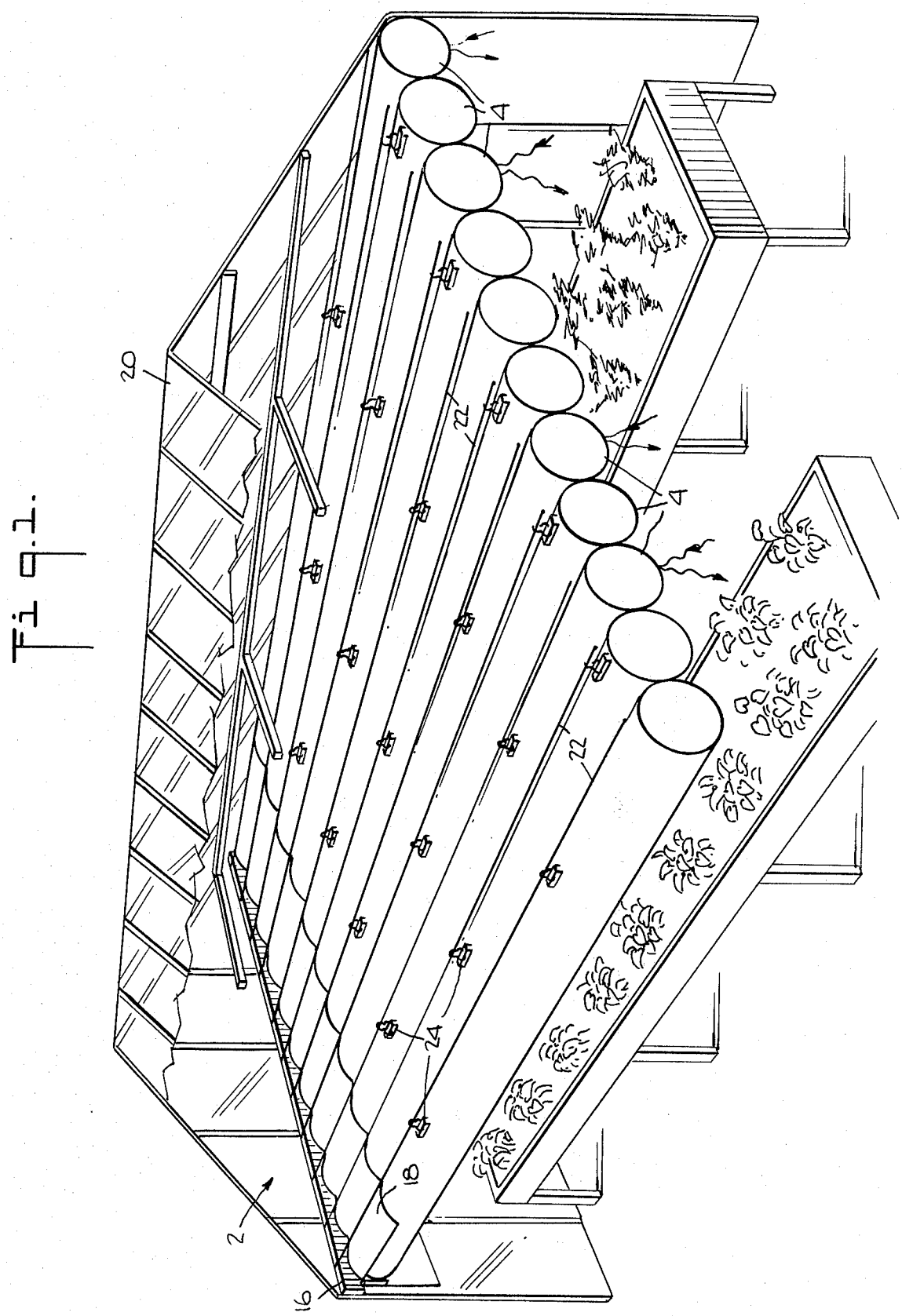

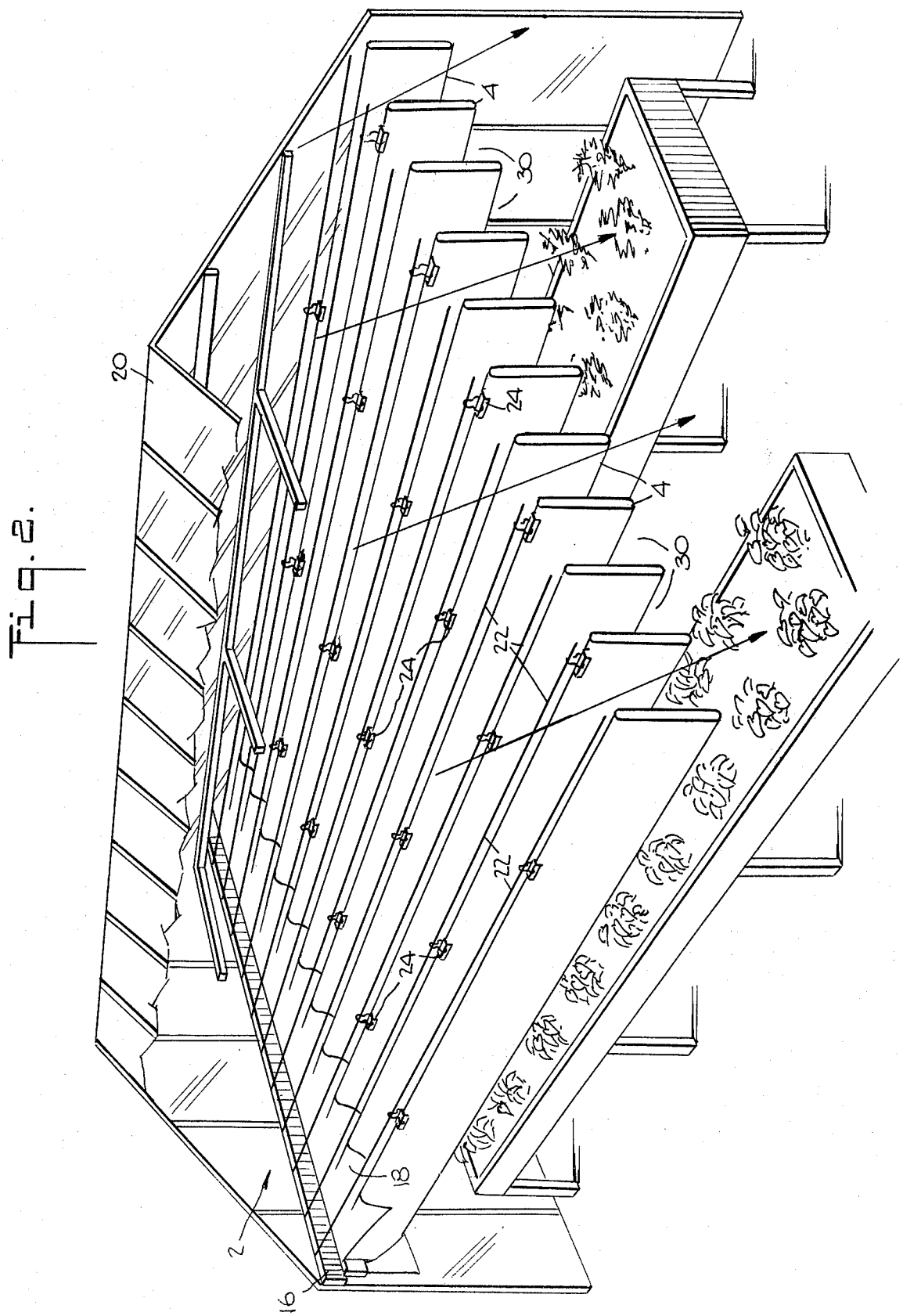

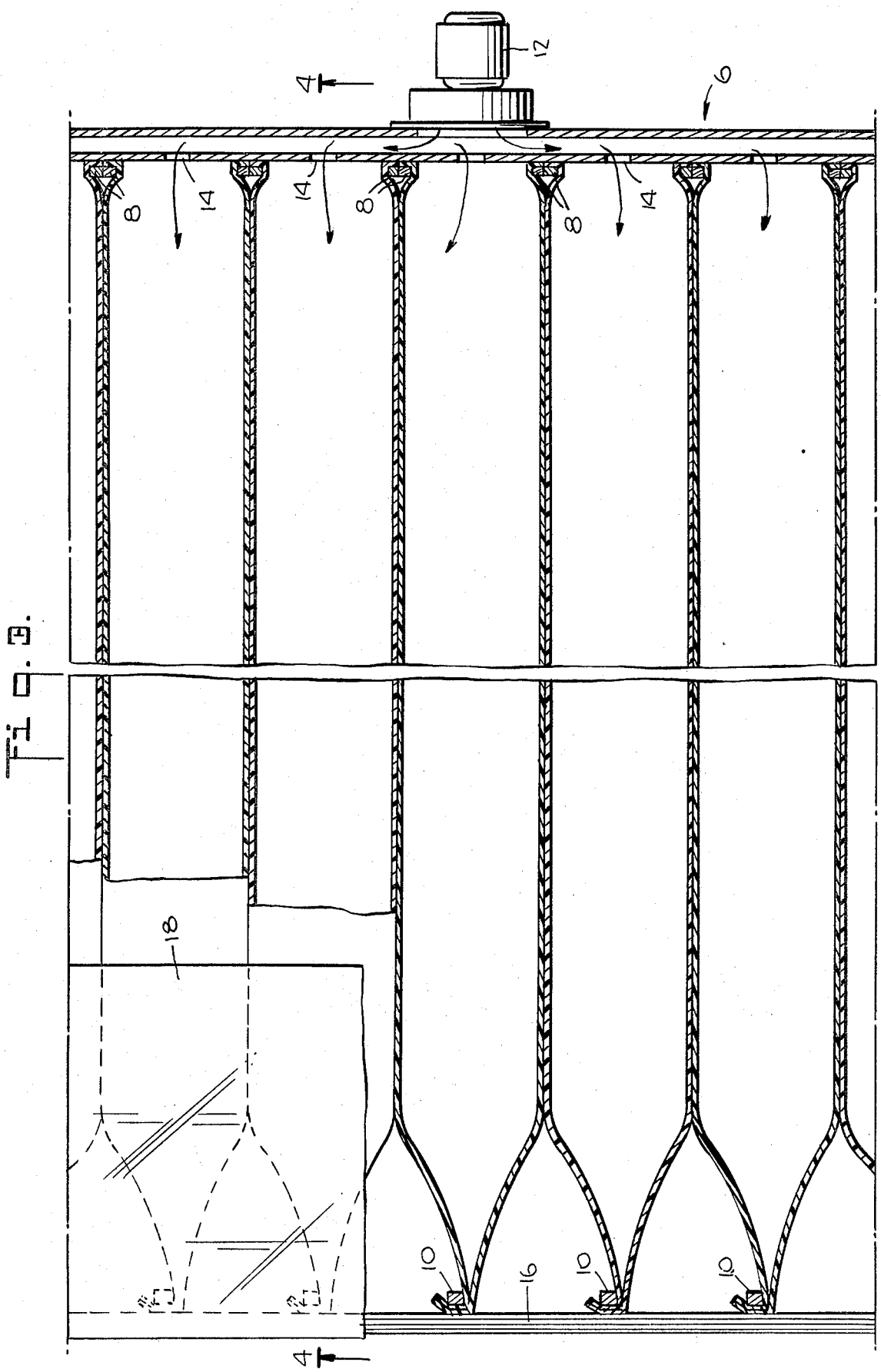

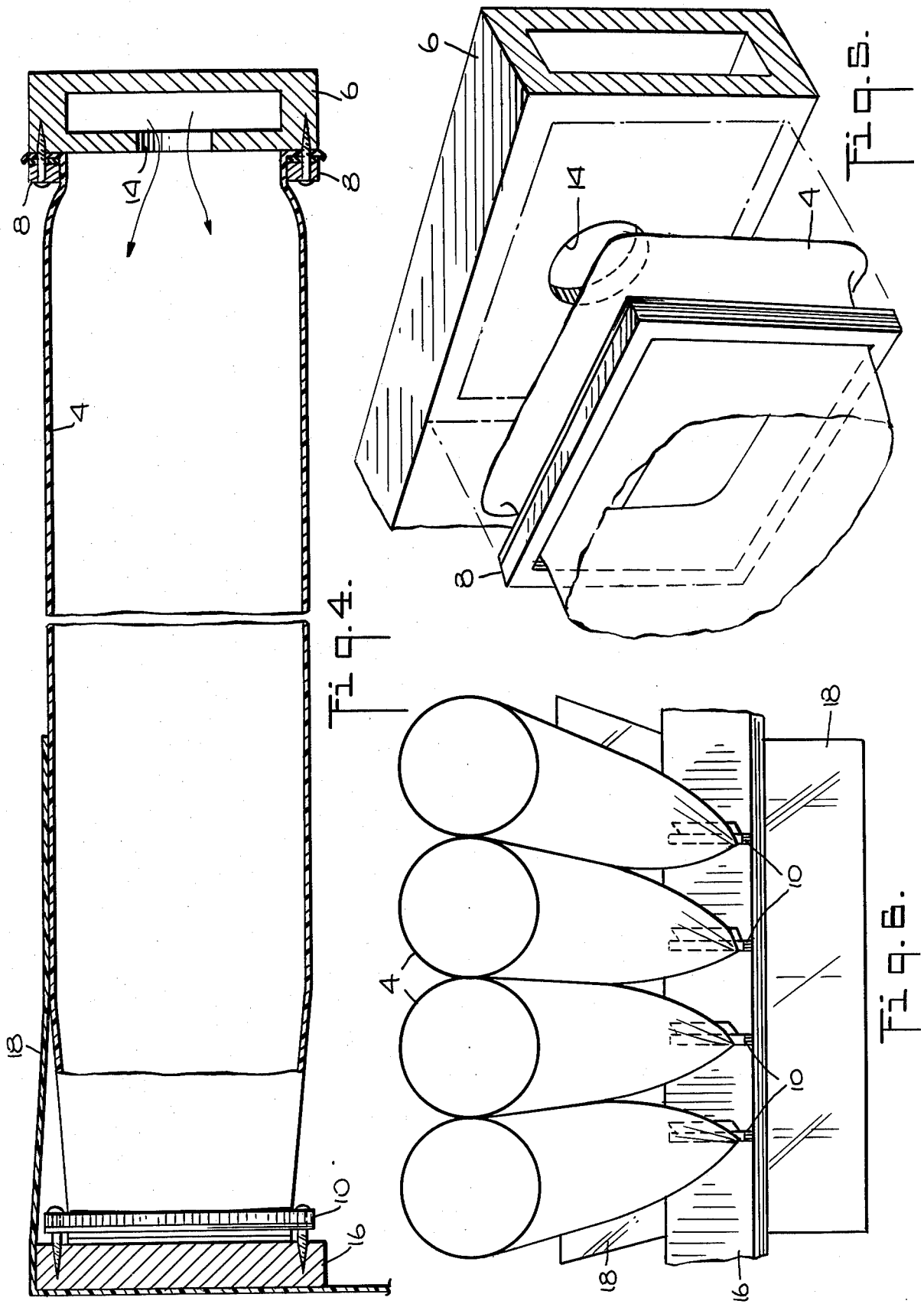

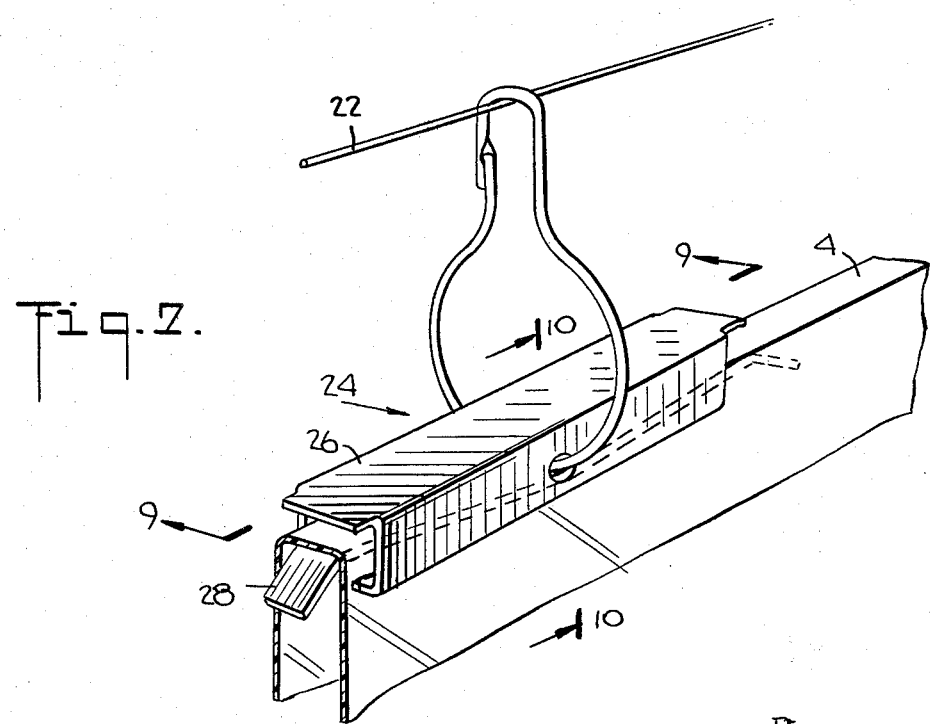
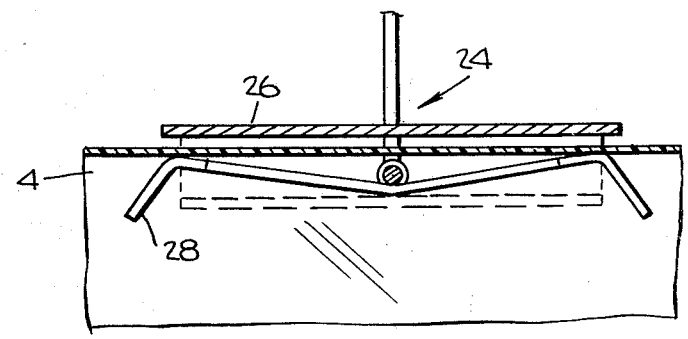
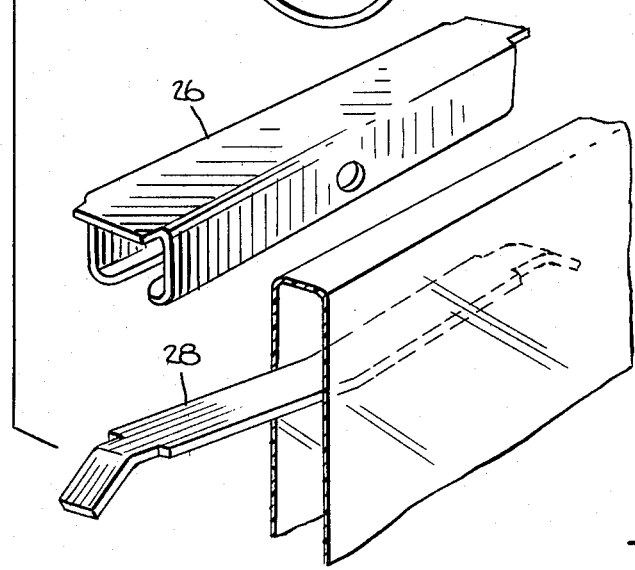
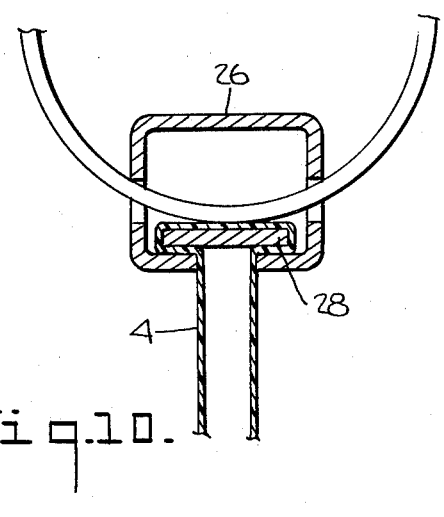

GREENHOUSE TUBULAR INSULATION BARRIER

FIELD OF THE INVENTION

The invention relates to devices for providing heat insulation. More particularly, the invention relates to providing heat insulation for structures such as greenhouses with a minimum of light obstruction.

BACKGROUND OF THE INVENTION

DESCRIPTION OF THE STATE OF THE ART

Much effort has been and is being focused on developing fuel conservation measures in general. One area in which particular effort has been directed to fuel conservation is greenhouse growing. Greenhouses customarily operate to accelerate and promote growth of plants by delivering large amounts of light, heat and moisture to plants.

Typically greenhouses are structures with light transparent roofs and in many cases, light transparent walls. Heat is provided for the greenhouses both by fuel consuming heaters and solar heat passing through the light transparent sections of the greenhouse.

One approach to fuel conservation in greenhouses has been directed to minimizing fuel consumption by the development of more efficient heat generation such as solar heat deflectors and heater systems capable of better heat distribution and temperature regulation.

Efforts have also been made to develop systems and apparatus for enhancing the insulation of greenhouses. The basic problem is that the sunlight desired and necessary for growing must not be markedly reduced by the insulation.

One attempt to insulate greenhouses is the inflated polyethylene double cover wherein two layers of very large sheets of polyethylene are draped over the outside of a greenhouse roof and provided with an internal air layer to form a heat insulation barrier. The apparatus is clumsy, laborious to assemble, exposed to the elements and reduces ventilation.

Interior insulation devices have also been developed. One device is a single fixed sheet, usually polyethylene, which has been arranged as a dropped roof at about eave height. A similar design of a movable sheet which can be rolled or drawn across the greenhouse at eave level as desired, has also been used. The former inimically obstructs light and reflects light outwardly and the latter collects the condensation and water leakage which is rained down on the plants when the sheet is drawn back for light exposure. Further, water on top of sheet makes movement of the sheet very difficult. The latter also has the disadvantage of harshly exposing the plants to the cold air blast from above the sheet since the sheet must be completely drawn to allow morning light passage before the air above the sheet can be warmed.

Another interior insulation system is the Clicon tube system designed for a controllable shading system wherein double inflatable tubes coated with aluminum are inflated and deflated to respectively block light and heat or to reflect light into the house.

Another effort using inflatable tubes has been tried with unsuccessful results. Inflatable uncoated polyethylene single tubes have been used with fiberglass roofs, and in a study conducted by R. L. Perry reported in Paper No. 75-4021 at the 1975 ASAE Annual Meeting was found to be too light obstructive for greenhouse application.

SUMMARY OF THE INVENTION

It is an object of the present invention to provide a structure for insulating a glass-roofed greenhouse without inimically obstructing the sunlight necessary for plant growth.

It is another object of the present invention to provide insulation for a glass-roofed greenhouse which insulation can provide variable size passage openings for sunlight and can gradually regulate the size of the passage openings.

The apparatus and process of the present invention in the essential aspects is a plurality of clear polyethylene inflatable tubes which extend the length of a glass-roofed greenhouse at eave height anda which, upon inflation, bear against each other to form a barrier to trap heat below the eave level. The tubes are sealed to a manifold or header on one end and terminate at the other end is constricted closures which reduce the tube diameter as much as possible. A sheet of clear polyethylene is draped over the constricted ends of the tubes and cover about six to ten feet of the tubes at the constricted end.

A regulatable blower is mounted in communication with the header to deliver air to or evacuate air from the tubes.

In operation, the tubes are inflated to the fully inflated condition to form a heat barrier when sunlight is absent. When the sunlight is available the tubes are deflated to provide light access passages for the sunlight to reach the plants. The inherent transparency and reflectability of the clear polyethylene in combination with passage facilitates the necessary light passage and light diffusion desirable for plant growth.

DESCRIPTION OF THE DRAWINGS

This invention will be better understood when considered with the following drawings wherein:

FIG. 1 is an isometric view of a portion of the tubular insulation barrier in the inflated mode;

FIG. 2 is an isometric view of the same portion of the tubular insulation barrier in the deflated mode which allows sunlight rays to pass through the glass roof of the greenhouse between the tubes and reflect downward from the vertical side of the deflated tubes to the plants in the greenhouse;

FIG. 3 is a split sectional plan view of the inflatable barrier assembly showing both ends;

FIG. 4 is a split sectional elevational view of the thermal barrier taken through line 4—4 of FIG. 3;

FIG. 5 is an exploded view of the means for attaching a tube to the manifold;

FIG. 6 is a bottom isometric view of the end of the thermal barrier opposite the manifold;

FIG. 7 is an isometric view of the support wire and clip for attaching the tubes to the support wire;

FIG. 8 is an exploded view of the assembly of FIG. 7;

FIG. 9 is an elevational view through line 9—9 of FIG. 7; and

FIG. 10 is an elevational view through line 10—10 of FIG. 7.

DESCRIPTION OF THE PREFERRED EMBODIMENT

The tubular insulation barrier 2 which forms the present invention is uniquely suited for used in greenhouses having glass roofs. The tubular insulation barrier 2, in the inflated mode, provides essentially a dropped roof at eave level after or at periods when sunlight is absent that retains the heat generated in the greenhouse.

The combination of the glass roof 20 in the greenhouse and the tubular insulation barrier 2 in the deflated mode to provide openings, seen in FIG. 2, enable the necessary direct and reflected diffused light to reach the plants in the greenhouse when sunlight is available.

The insulation barrier 2 is comprised of an assembly of thin-walled clear polyethylene plastic tubes 4, a manifold or header 6 and a sheet of clear plastic 18 provided to afford the complete barrier necessary at the end of the tubes 4 opposite the header 6.

Each of the tubes 4 as seen in FIG. 4 is attached to header 6 by a peripheral seal 8. In practice, the peripheral seal 8 is formed suitably of ferring strips having rubber or plastic or some other deformable material which capture the ends of the plastic tubes 4 and seal the tubes to the header 6. The tubes 4 are formed of clear polyethylene and are essentially transparent. A suitable grade of clear polyethylene is Clear Polyethylene Convection Tubing having a transparency rating of 80-85%. In practice, it has been found that the polyethylene tube material is 4 mil. gauge.

In practice, it has been found that a workable insulation barrier 2 can be made of polyethylene tubes eighteen inches in diameter in the inflated mode which are set apart from each other on the header 6 on sixteen inch centers. As seen in FIGS. 1 and 4, the tubes 4 are arranged parallel to each other and extend the entire length of the greenhouse. A sufficient number of tubes 4 are selected to insure coverage of the complete width of the greenhouse.

On the end opposite the header 6, the tubes 4 are terminated in constricted closures as best seen in FIGS. 3 and 6. The constriction is effected by tube ties 10 which tightly wrap around the tubes 4 and close the end of each tube 4. The downstream end of the tube is attached to a beam 16 also at eave level for support. The existence of constricted closures at one end of the tubes 4 provides a structure which will upon deflation contract to hang free and thereby provide the necessary light openings between the tubes 4.

A sheet of clear plastic 18 sufficiently long to extend the width of the greenhouse and about six to ten feet wide is draped over the constricted end of the tubes 4 to provide the necessary heat barrier and seal at the beam 16 end or downstream end. Thus, the sheet 18 extends about six to ten feet from the beam 16 toward the header 6. The material of the clear plastic sheet 18 is the same as the material of the tubes 4.

As best seen in FIGS. 3, 4 and 5, each of the tubes 4 is secured to the header 6 which header is completely closed except for header openings 14 which provide communication between the interior of each tube 4 and the header 6. A blower motor 12, seen in FIG. 3, is provided to deliver air to the header 6 and ultimately to the interior of each of the tubes 4 and to regulate the evacuation of the air in the header 6 and the tubes 4 to provide controlled deflation of the tubes 4. In practice, a 1/16 horse squirel cage motor has been found suitable for application as the blower motor 12.

As best seen in FIGS. 1 and 2, the tubes 4 are in part supported by a wire 22 extending the length of each tube 4 from the header 6 to the beam 16 at the opposite end of the tubes 4. The wire 22 is preferrably located along the center line of the tubes 4. Clips 24, seen in FIGS. 7-10, formed of an outer member 26 and an inner member 28 are used to capture the skin of the tubes 4 without effecting any penetration. The inner member 28 is located within the tubes 4 and can be slidably inserted into the outer clip member 26 without piercing the tube material. The clips 24 are located at intervals of about twelve to fifteen feet.

In operation, the motor 12 is engaged to deliver air to the header 6 and ultimately to the tubes 4 to inflate the tubes when sunlight is absent. The inflated tubes abut each other except for the short section near the constricted closure at the beam 16 or downstream end. With the tubes 4 inflated and the clear plastic sheet 18 the entire greenhouse is provided with a barrier to capture heat below the eave level.

When sunlight becomes available, the motor 4 is turned off and evacuates air from the header 6 and the tubes 4 at a controlled rate to deflate the tubes 4. As seen in FIG. 2, the deflated tubes provide openings 30 through whcih the light coming through the glass roof 20 can pass and reflect to reach the plants in the greenhouse.

Controlled deflation of the tubes 4 is vital because the differential in air temperature between the roof area above the tubes 4 and the hot house area below the tubes 4 is very large. It is undesirable to immediately expose the plants in the warm section below the tubes 4 to the cold air above the tubes 4. It has been found in practice that when the outside temperature is 0-10° F., the temperature in the roof section above the tubes 4 can be as low as 34° F. when the temperature below the tubes is 60° F. Thus, the differential in temperatures can be as great as 24° F. Practice has also taught that the time interval to go from the fully inflated to completely deflated mode should be from 30 minutes to 60 minutes depending on the temperature differential above and below the tubes 4.

The use of glass roofs 20 as used in this application means roofs which are not formed of fiberglass. It is undesirable to use the tubular insulation barrier 2 of the subject invention with fiberglass roofs because the amount of light which is necessary for plant growth may not be available. In tests made with corrugated sheets of rigid fiberglass-reinforced polyester resin, polyethylene tube ceilings have decreased light by 33%, to produce an undesirable light obstruction level.

I claim:

1. An apparatus for retaining heat within a greenhouse and providing necessary light to the plants in the greenhouse comprising:
   a glass roof;
   a plurality of inflatable essentially transparent tubes below the glass roof arranged in parallel across the width of the greenhouse which tubes extend longitudinally from one end of the greenhouse to the opposite end of the greenhouse;
   a header extending the entire width of the greenhouse at eave level which header is in communication with the tubes;
   tube ties to constrict the ends of the tubes at the end opposite the header;
   a sheet of clear plastic draped over the tubes at the constricted end; and
   a blower motor adapted to deliver or evacuate air from the header.

2. An apparatus as in claim 1 wherein the inflatable tubes are clear polyethylene having a transparency of 80-85%.

3. An apparatus as in claim 1 wherein the clear polyethylene tubes are 18 inches in diameter and are mounted at the same elevation on the header on 16 inch centers.

4. An apparatus as in claim 1 further comprising wires extending the length of each tube at a location above the center line of each tube; and clips having internal and external parts to grip the tubes without piercing the tube.

5. An apparatus as in claim 4 wherein the clips are located approximately every 15 feet over the length of the tube.

6. An apparatus as in claim 2 wherein the inflatable tubes and the clear plastic sheet are clear polyethylene having 80-85% transparency and a wall thickness of 4-6 mil. guage.

7. A method for trapping heat in a greenhouse below eave level when sunlight is unavailable and providing sunlight to the greenhouse area below eave level when sunlight is available comprising the steps of:

arranging a plurality of parallel tubes over the width of the greenhouse, which tubes are clear polyethylene tubes having a transparency of 80-85% and extend from one end of the greenhouse to the other;

inflating the tubes to abut each other and form a complete barrier at eave level when sunlight is absent; and deflating the tubes at a controlled deflation rate to provide openings between the tubes when sunlight is available, wherein the controlled deflation of the tubes occurs within thirty to sixty minutes.

* * * * *